March 31, 1942. E. R. BERLUTI 2,278,121
FIXTURE FOR ATTACHING BUMPERS OR THE LIKE TO AUTOMOBILE FRAMES
Filed March 21, 1940 2 Sheets-Sheet 1
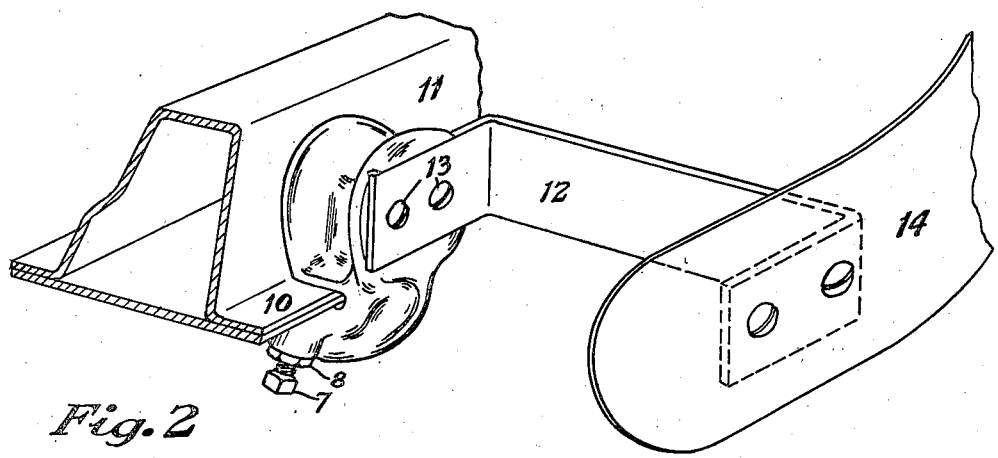
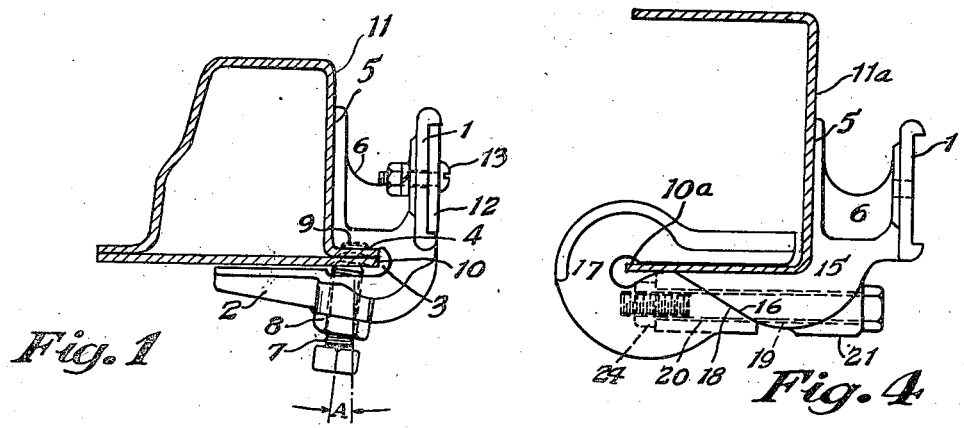
INVENTOR
ERCOLE R. BERLUTI
BY George C. Willcox
ATTORNEY March 31, 1942.　　E. R. BERLUTI　　2,278,121
FIXTURE FOR ATTACHING BUMPERS OR THE LIKE TO AUTOMOBILE FRAMES
Filed March 21, 1940　　2 Sheets-Sheet 2

INVENTOR
ERCOLE R. BERLUTI
BY
ATTORNEYS

Patented Mar. 31, 1942

2,278,121

UNITED STATES PATENT OFFICE 2,278,121

FIXTURE FOR ATTACHING BUMPERS OR THE LIKE TO AUTOMOBILE FRAMES

Ercole R. Berluti, Saginaw, Mich.

Application March 21, 1940, Serial No. 325,163

2 Claims. (Cl. 293—55)

This invention relates to improved clamping means or brackets for securing fender guards or the like to frame members of vehicles, and has for its principal object the provision of an improved clamping device to engage a longitudinal frame member or girder and carry the fender or other accessory. Its object is to provide a novel clamp or bracket which shall be simple and inexpensive to manufacture and which may be installed easily and securely without need for drilling holes or using any special tools.

A further object is to provide a complete bumper-carrying assembly comprising a bracket according to the invention, having a minimum number of parts and which, for purposes of aligning and locating fender guards or lateral bumpers on vehicles of varying dimensions, is adjustable to a variety of positions in all three dimensions when it is installed. A standard assembly of this kind may be used on a great number of vehicle makes and models having different spacings and relationships between their frames and fenders or other external body parts relative to which the bumper or fender guard must be located.

The foregoing and other features and advantages of the invention will be described more fully in the course of the following specification.

Referring to the drawings, which show applications of the invention to frame-engaging brackets of various types:

Fig. 1 is a side elevation of a bracket according to the invention applied to a box-type girder member of an automobile frame, viewed lengthwise of the frame;

Fig. 2 is a perspective view of the bracket of Fig. 1, showing a bar attached to the front end of a rear fender guard;

Fig. 3 is a side elevation of a bracket according to the invention, modified for application to a channel-shaped frame member;

Figure 6:
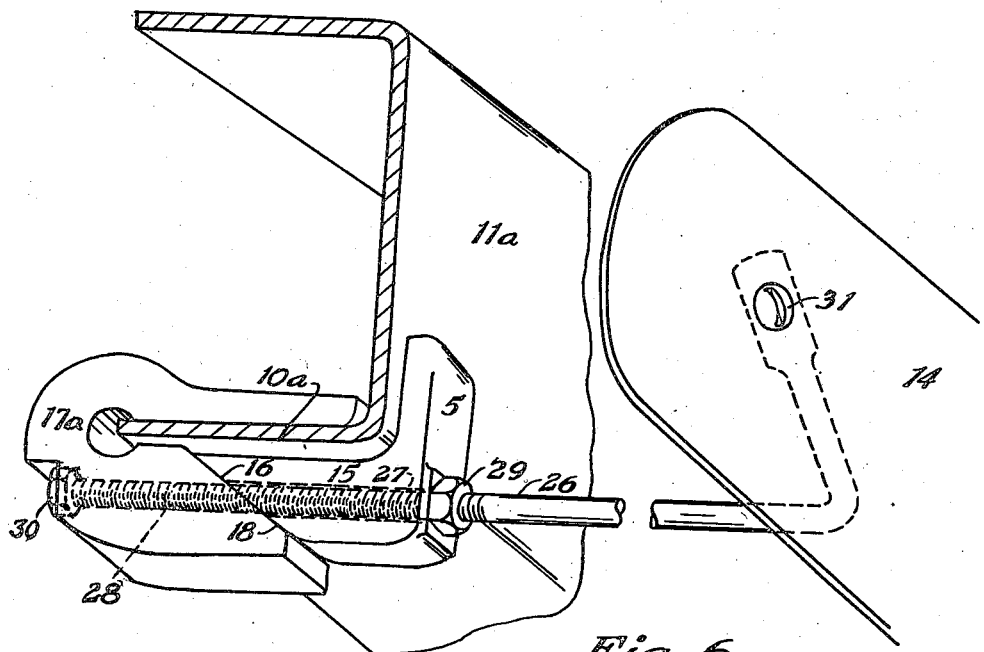

Figs. 4 and 5 are a side elevation and bottom view respectively of a third form of bracket embodying the invention; and Fig. 6 is a perspective view of still another modification of the invention, in which the bracket is combined with a novel bumper-carrying element which serves also as a bracket tightening screw, the assembly being capable of adjustment to a variety of positions and dimensions for aligning and locating the fender guard relative to the fender or other external part of the vehicle body.

Referring first to Figs. 1 and 2, the bracket shown consists of an integral fixture comprising a pad or face plate 1 to receive the bumper assembly or other device to be attached. A laterally projecting arm 2 extending inwardly of the vehicle frame presents an upwardly directed face positioned to bear against the bottom of the frame member. A horizontal opening 3 is formed in the bracket to receive the outer lateral flange 10 of the frame member. The upper face 4 of the notch 3 is positioned to bear downwardly against the top of flange 10. The bracket presents also an integral face plate or bearing member 5 spaced inwardly from pad 1, positioned to bear laterally against the upright side face 11 of the frame member, and connected by an integral stiffening web 6 with pad 1.

Adjustable means for securing the bracket unit to the frame member consists in the instant device of a tapered-end set screw 7 tapped through the horizontal arm 2 into the notch 3 to engage firmly against the bottom of the lateral flange 10 of the frame member. A lock-nut 8 is provided for securing set screw 7 firmly in its tightened position. The downwardly directed face 4 of the bracket at notch 3 is preferably relieved at 9 to receive flange metal which may be displaced upward, as indicated by dotted lines in Fig. 1, when the set screw 7 is tightened. The bracket 1 is installed upon the frame member by slipping it over the lateral flange 10 of the frame member and drawing it snugly into place by tightening set screw 7. To draw the bracket in against the outer face 11 of the frame girder, set screw 7 is set at angle A from the vertical. This inclination of the set screw also effectively resists any outward loosening strains upon the bracket.

A strap metal member 12 is secured by bolts 13 to the pad 1, and extends behind the rear wheel (not shown) outside of the fender skirt (not shown). The forward end of a fender guard 14 designed to protect the fender skirt is shown secured to the outer end of bracket bar 12.

Fig. 3, in which numerals corresponding to numerals in Figs. 1 and 2 designate equivalent parts, illustrates a modified form of the bracket of Figs. 1 and 2 designed to fit a frame member of U-channel section having no outwardly projecting lateral flange, such as 10 in Fig. 2. The horizontal arm 2 is recurved at its end to present a hook 4a bent upwardly and inwardly to engage over the bottom flange 10a of the frame member. The hook presents a horizontal surface to bear downwardly against the top of the flange 10a. The outer upright face 11a of the frame member is engaged by a set screw 7a tapped through the face plate 5a of the bracket. Set screw 7a constitutes means bearing inwardly against the upright side plate of the frame member, and also, in a slightly different way performs the retaining function of set screw 7 in Figs. 1 and 2. When installed on the girder 11a the bracket assembly presents elements adapted to bear downwardly and upwardly on flange 10a, inwardly upon face plate 11a and outwardly against the girder. Forces applied in any direction to the bracket which tend to dislodge the bracket from the frame are thus effectively resisted.

Figs. 4 and 5 show a bracket assembly similar to the brackets of Figs. 1–3 in its bearing relationships to the frame member, but different in its specific construction and the means for attaching and tightening it in place. It is particularly adapted to ready installation on certain motor vehicles where set screws as in Figs. 1, 2, and 3 would be inaccessible or otherwise undesirable. It comprises a pad 1 to carry the bumper assembly and a face plate 5 connected by a web 6 to pad 1 to bear laterally against the upright face 11a of the frame member.

The bottom portion of the bracket assembly is divided into two parts. A member 15 integral with face plate 5 extends transversely of the girder to bear against its bottom, and its inner end is beveled to present an inwardly and upwardly sloping face or ramp 16. A separate hooked member 17 is beveled at its outer end to present a ramp 18 congruous with ramp 16, to coact wedgewise with it when pieces 15 and 17 are drawn together and urge member 15 upwardly. The recurved portion of member 17 presents a face adapted to bear downwardly upon the bottom flange 10a of the frame member.

Members 15 and 17 of the assembly are provided with coaxial bores 19 and 20 respectively. Bores 19 and 20 are larger than the bolt 23, at least in their vertical dimension, to permit relative vertical shifting of pieces 15 and 17 when the assembly is tightened. Bore 19 extends through a boss 21 on the under face of member 15. Piece 17 is relieved at 22 (see Fig. 5) to expose the end of a bolt 23 which is passed through the bores 19 and 20. Nut 24 on the bolt 23 bears against a shoulder 25 at the inner end of bore 20, and when tightened draws pieces 15 and 17 together, urging the hook of piece 17 downwardly upon the flange 10a and wedging the upper horizontal face of arm 15 tightly into engagement with the under face of the flange. Face plate 5 is also drawn into firm engagement with the vertical face 11a of the frame member.

When the bracket assembly is tightened in place it is held firmly against inward, upward, or downward stresses and is prevented from being pulled outwardly by engagement of either the end or the bight of the hook member 17 with the frame member.

Fig. 6 shows another adaptation of the invention, affording certain novel advantages of structural simplicity and adaptability to the installation of bumpers or fender guards on vehicles of various body dimensions. It consists of a two-piece clamping bracket like that shown in Figs. 4 and 5, but having as a component part the member to which the bumper is attached. A heavy rod 26 having its outer end bent at an approximate right angle constitutes a bracket member to carry the fender guard, and at its inner end is threaded for a substantial distance to replace the bolt 23 of Figs. 4 and 5. It is passed through the enlarged bore 27 in piece 15 and is screwed into a tapped bore 28 in the hooked member 17a. A nut 29 bearing against the outer upright face of bracket member 15 draws pieces 15 and 17a together and locks the rod firmly in the threads of bore 28.

The advantages of this assembly are apparent from the following description of its installation upon a vehicle. In various automobiles or other vehicles the distance from the frame outwardly to the outer skirt of the fender varies, even in like models of the same manufacture. The height of the rear bumper relative to the frame of the car also varies from model to model and make to make. To install the assembly shown on any given car the clamping bracket is hooked in place over the inwardly extending flange 10a of the frame and adjusted lengthwise thereof to the approximate desired location. The rod 26 is inserted in bore 27 and screwed to the desired depth into the tapped bore 28 in piece 17a, that is, until its bent end is spaced from the frame the distance required to locate the fender guard horizontally with relation to the fender skirt. The rod is then adjusted through a fractional turn to locate the fender guard at the desired height. For this adjustment the fender guard 18 conveniently is loosely attached to its outer end by bolt 31. The bracket assembly is then finally readjusted lengthwise of the frame. Nut 29 is tightened, drawing the pieces 15 and 17a together and clamping the bracket assembly firmly upon the frame member. Bolt 31, or other suitable means for fastening the front end of the fender guard 14 to the bracket rod 26 is then secured. A nut 30 is preferably provided for the inner end of rod 26 to oppose any tendency for it to turn in bore 28 as a result of road shocks. A lock-nut on top of nut 29 may also be found desirable, or a lockwasher (not shown) may be used under nut 29 in known manner. Finally, any surplus length of rod 26 projecting inwardly of member 17a may be cut off.

Because of its adjustability in three dimensions the assembly just described is adaptable in one or two models to a great number of automobiles. A simple modification which does not depart from the invention adapts this same assembly to girders of various kinds, including a box section as shown in Figs. 1 and 2. The hook element 17a need only be modified in length to suit it to the shallower flange at the inside of the frame member. Other changes in dimensions, form and arrangement of the parts to meet specific conditions may also be made, within the scope of the invention as defined by the appended claims. For instance, the brackets of Figs. 3 through 5 may be designed for use on box girders as in Figs. 1 and 2.

Having thus described my invention, what I claim and desire to secure by Letters Patent is:

1. A clamping assembly for securing a fender guard or like fixture to a vehicle frame member presenting an inwardly projecting substantially horizontal flange and an upright outer face, said assembly consisting of a bracket element comprising a member to bear laterally inward against said upright face of the frame member, a second member formed and adapted to extend transversely beneath and engage the bottom of said frame member and presenting a ramp sloping upwardly to its inner end, a second bracket element formed at its outer end to present a ramp congruous to and adapted to engage slidingly over the ramp of the first bracket element and presenting at its inner end a hook adapted to engage over said flange to bear downward thereon, and outward against said frame member, means to draw said bracket members together comprising a threaded rod bent at its outer end to present a carrying arm for the fender guard adjustable in height and lateral spacing relative to the clamping assembly and frame member, said rod passing through alined bores in said elements extending lengthwise thereof and intersecting said inclined ramps, and nut means on said threaded rod for urging and holding the elements together in clamping relation to the frame.

2. An assembly as claimed in claim 1 wherein the bore in said second bracket element is tapped to receive said threaded rod, and a nut is threaded on said rod to bear inwardly against said first bracket element to clamp the elements to the frame.

ERCOLE R. BERLUTI.